(12) United States Patent
Lang

(10) Patent No.: US 8,674,565 B2
(45) Date of Patent: Mar. 18, 2014

(54) SYSTEM AND METHOD FOR INCREASING AIRFLOW IN ELECTRIC MACHINES

(75) Inventor: Nicholas G. Lang, Cincinnati, OH (US)

(73) Assignee: Siemens Industry, Inc., Alpharetta, GA (US)

( * ) Notice: Subject to any disclaimer, the term of this patent is extended or adjusted under 35 U.S.C. 154(b) by 425 days.

(21) Appl. No.: 13/018,874

(22) Filed: Feb. 1, 2011

(65) Prior Publication Data

US 2012/0194014 A1 Aug. 2, 2012

(51) Int. Cl.
*H02K 9/06* (2006.01)
(52) U.S. Cl.
USPC .................................. 310/52; 310/58; 310/59
(58) Field of Classification Search
USPC .................... 310/58–59, 52, 54, 57
See application file for complete search history.

(56) References Cited

U.S. PATENT DOCUMENTS

| 3,749,953 | A | * | 7/1973 | Baumann et al. | 310/62 |
| 2004/0222711 | A1 | * | 11/2004 | Klimt | 310/59 |
| 2005/0079069 | A1 | | 4/2005 | Fujiki | |
| 2008/0111433 | A1 | | 5/2008 | Kreitzer | |

OTHER PUBLICATIONS

PCT Invitation to Pay Additional Fees mailed Apr. 3, 2013 corresponding to PCT International Application No. PCT/US2012/022524 filed Jan. 25, 2012 (10 pages).
PCT International Search Report mailed Jun. 14, 2013 corresponding to PCT International Application No. PCT/US2012/022524 filed Jan. 25, 2012 (18 pages).

* cited by examiner

*Primary Examiner* — Tran Nguyen
*Assistant Examiner* — Leda Pham

(57) ABSTRACT

An air-cooled electric machine, such as an alternating current motor, having a housing containing a rotating shaft and a housing airflow cooling path has cooling vents on the housing periphery. An external cooling system having a duct enclosure is coupled to the housing exterior, and defines a duct airflow cooling path that is in communication with the housing airflow cooling vent and housing airflow cooling path. A duct fan within the duct enclosure external the housing is coupled to and driven by the shaft. The duct fan circulates air at above ambient pressure into the housing airflow cooling path.

15 Claims, 4 Drawing Sheets

SYSTEM AND METHOD FOR INCREASING AIRFLOW IN ELECTRIC MACHINES

BACKGROUND OF THE DISCLOSURE

1. Field of the Invention

The present invention is directed to electric machine external, cooling systems and in particular air cooled systems for circulation of additional cooling air volume and pressure into an alternating current (ac) motor housing.

2. Description of the Prior Art

Electric machines, such as ac motors, generate heat during operation. It is desirable to transfer heat out of the electric machine's housing during operation. In the past motors and other electric machines have been provided with housing vents and internally formed channels to provide housing airflow cooling paths for circulating air in, through and out of the housing. Airflow circulation through the housing airflow cooling paths has been enhanced by addition of housing internal fans, powered by the electric machine's shaft, oriented within the housing and in communication with the housing cooling paths.

While an internal housing fan increases cooling air circulation through an electric machine's housing airflow cooling paths, its pumping capacity is limited by blade size and geometry constraints, such as length, width, blade cross-section, pitch and blade quantity. The internal housing fan diameter is limited to that which fits within the housing's internal diameter envelope. Similarly, blade width and pitch is limited to the axial space constraints within the housing interior.

Another known way to increase electric machine internal, heat transfer capability through housing airflow cooling paths has been to utilize externally powered fans blowing air into motor enclosures. In this way ambient air is drawn into the motor's inlet cooling vents and heated air exiting outlet cooling vents in the housing can be more readily dissipated to ambient air surrounding the motor. Such solutions require additional powered cooling sources or fans outside the motor in the motor room or a new additional motor enclosure. Those solutions require provision for additional power sources to power the external fans or other environmental cooling devices, and possibly new enclosures.

Air-to-cooling fluid heat exchanges have also been employed within electric machine housings, including totally-enclosed motors that recirculate and cool air within a motor housing. Totally-enclosed motors are often installed in harsh environmental surroundings (e.g., corrosive, abrasive or other solid dust contaminants, fouling sprays, electrically conductive dust, and explosive vapor/dusts). In totally-enclosed motors, heated air in the housing airflow cooling path transfers heat to an internal heat exchanger, and in turn the heat is transferred to a circulating cooling fluid. As with internal housing fans, internally mounted heat exchanger heat transfer capacity is limited by the size of exchanger that can be enclosed within the motor housing.

Thus a need exists in the art for an electric machine cooling system whose airflow cooling capacity is not limited by the size of cooling components contained within the machine's housing.

A need also exists in the art for an electric machine cooling system that does not require an external power source outside the machine housing to increase airflow cooling capacity, as is required when external fans or air conditioning equipment is installed in a motor room or enclosure in order to increase general heat transfer capacity of surrounding ambient air.

Another need exists in the art for an electric machine cooling system that increases airflow cooling capacity, yet that can be retrofitted to existing electric machine designs, including open-vented or totally-enclosed motors. Further, it is desired that the retrofit capability to fulfill this need be implemented any time during manufacture, at existing field installation sites, or during maintenance overhauls in repair shops.

SUMMARY OF THE INVENTION

These and other needs are satisfied by the system and method for increasing electric machine airflow capacity of the present invention. The present invention features an external, cooling system having a duct enclosure that is coupled to the housing exterior. The duct enclosure defines a duct airflow cooling path that is in communication with an electric machine housing airflow cooling vent and housing airflow cooling path. A duct fan within the duct enclosure external the housing is coupled to and driven by the shaft, so that there is no need to provide an external power source for that fan. The duct fan circulates air at above ambient pressure into the housing airflow cooling path. By providing an externally mounted duct fan, in addition to any existing housing fan already in the housing airflow cooling path, the duct fan can be dimensioned and optimized to achieve higher airflow rates and positive pressure above ambient pressure without being constrained by available dimensions and volume within the electric machine housing. The duct enclosure forming the duct airflow cooling path and incorporating the duct fan is in communication with the housing airflow cooling path by way of the housing's existing inlet and/or outlet cooling vents. Direct communication of the duct and housing airflow cooling paths eliminates the need for increasing the general cooling capacity of ambient air within the electric machine's operating environment.

The present invention external duct can be coupled to an electric machine inlet cooling vent to blow positive pressure air into a housing. The present invention external duct can also be coupled to an electric machine outlet cooling vent, where the exhausted air is fed into the duct fan intake for repressurization and return to the housing airflow cooling path. The present invention external duct advantageously can be coupled to both inlet and outlet vents of an electric machine housing, and can be applied to a totally-closed motor cooling air circulation closed loop.

The present invention duct enclosure with duct fan cooling system can be retrofitted to existing electric machines at the factory during manufacture, at field locations or in the repair shop during routine maintenance or service.

The present invention features an electric machine with external cooling system, comprising an electric machine having a housing including therein a rotating shaft retained within the housing. At least one housing airflow cooling vent is formed in the housing periphery. A housing airflow cooling path, defined within the housing is coupled to the housing airflow cooling vent. A modular duct enclosure is externally coupled to the housing, and includes a duct airflow cooling path, defined within the duct enclosure, that is in communication with the housing airflow cooling vent. A duct fan within the duct enclosure, external the housing, is coupled to and driven by the shaft, and is in communication with both the duct airflow cooling path and the housing airflow cooling vent. The duct fan circulates air at above ambient pressure into the housing airflow cooling path.

The present invention also features an external cooling system that is coupled to an electric machine of the type having a housing including therein a rotating shaft retained within the housing; at least one housing airflow cooling vent formed in the housing periphery; and a housing airflow cooling path, defined within the housing, coupled to the housing airflow cooling vent. The external cooling system comprises a duct enclosure adapted to be coupled to an electric machine housing airflow cooling vent external the housing. A duct airflow cooling path, defined within the duct enclosure, is adapted for communication with the housing vent. A duct fan within the duct enclosure and external the housing, is adapted to be coupled to and driven by the shaft, and in communication with the duct airflow cooling path and the housing airflow cooling vent, for circulating air at above ambient pressure into the housing airflow cooling path.

The present invention also features a method of externally cooling an electric machine of the type having a housing including therein a rotating shaft retained within the housing; at least one housing airflow cooling vent formed in the housing periphery; and a housing airflow cooling path, defined within the housing, coupled to the housing airflow cooling vent. The method comprises coupling a duct enclosure to the electric machine housing airflow cooling vent external the housing. The method further comprises providing a duct airflow cooling path, defined within the duct enclosure, adapted for communication with the housing vent. The method also comprises coupling a duct fan to the shaft within the duct enclosure and external the housing, and orienting the duct fan in communication with the duct airflow cooling path and the housing airflow cooling vent. Air at above ambient pressure is then circulated into the housing airflow cooling path.

The features of the present invention can be utilized jointly or severally in any combination at the discretion of those skilled in the art.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Prior Art Internal Fan Cooled Motors

Figure 1:
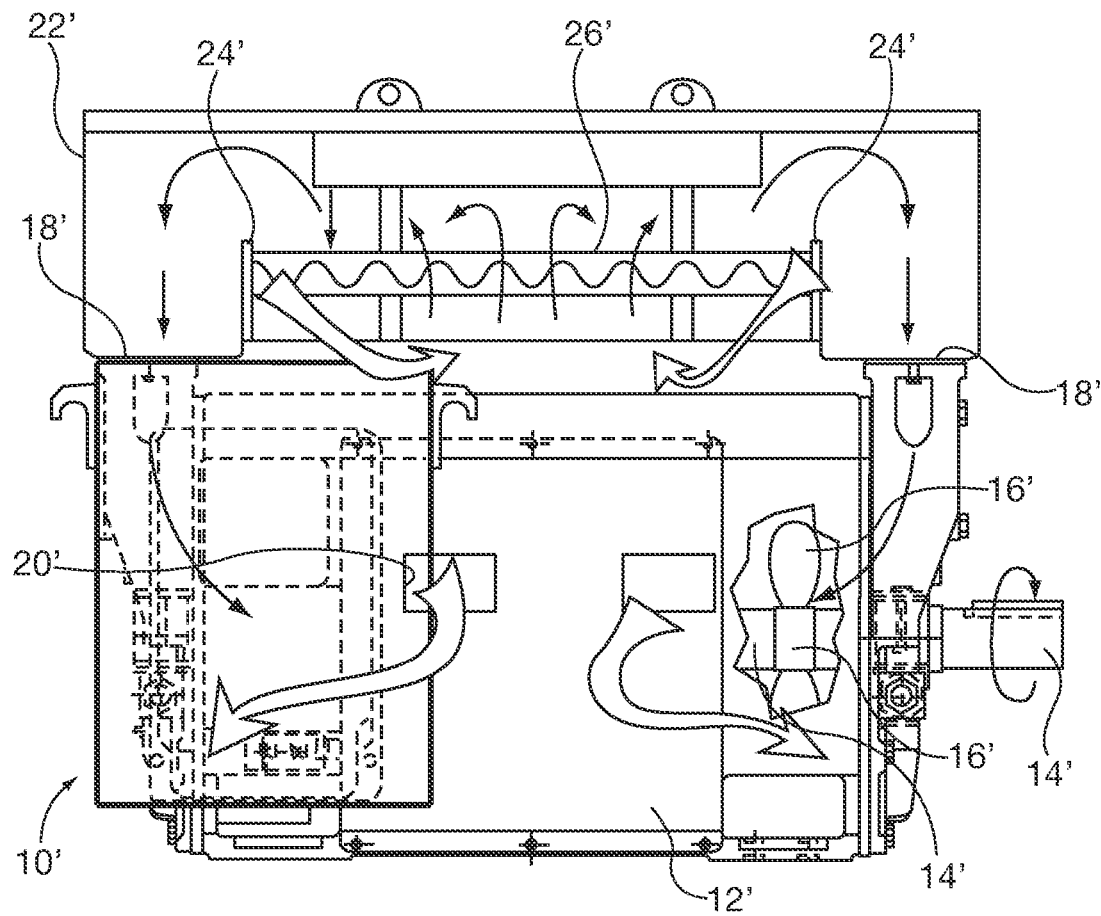
FIG. 1 is a partially cut-away elevational view of a prior art electric machine "open" frame motor with an intake air cleaner that draws ambient cooling air and vents heated air to ambient.

FIG. 1 shows schematically a known induction motor 10' with motor housing 12' and rotating shaft 14'. Internal shaft-mounted housing fan 16' provides for enhanced airflow circulation, within the airflow cooling path from the housing cooling inlet 18' and housing cooling outlet 20'. Ambient air (double arrows) is drawn into air filter shroud 22' in a gap between the bottom of the shroud and the upper surface of motor housing 12'. Baffles 24' within the shroud guide incoming ambient air through air filter element 26' and inhibit infiltration of atmospheric moisture or debris. Filtered air in the shroud airflow enters cooling inlet 18' and follows a housing airflow cooling path, assisted by the mechanical air pumping performed by the housing fan 16'. As those skilled in the art appreciate, motor 10' may have a plurality of housing cooling inlets 18, housing cooling outlets 18, housing airflow cooling paths and housing fans 16'. In some motors 10' a housing fan is mounted on both ends of shaft 14'.

The Present Invention External Cooling System

Figure 2:
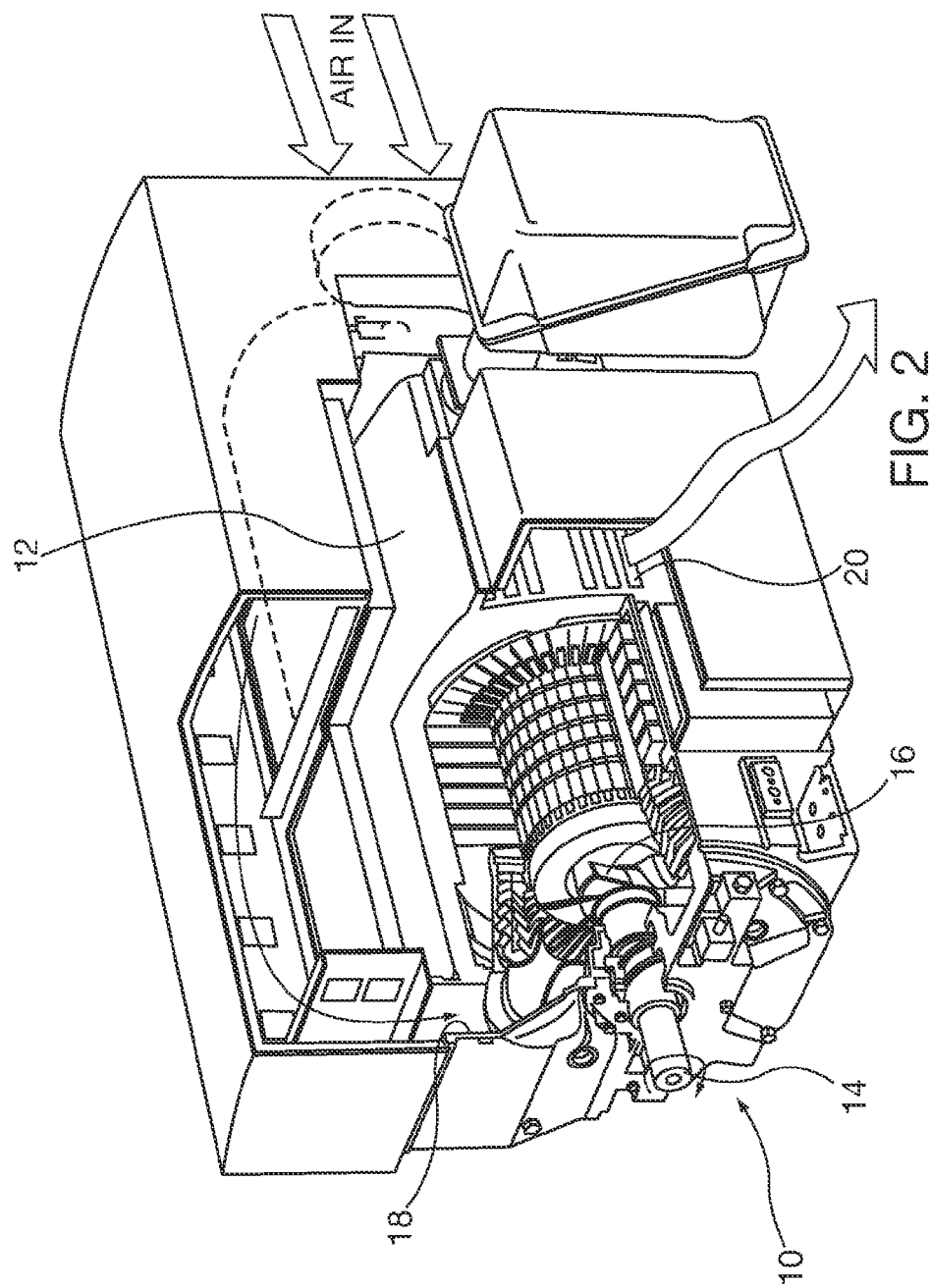
FIG. 2 is a partially sectioned perspective view of an electric machine alternating current motor with a cooling system embodiment of the present invention.
Figure 3:
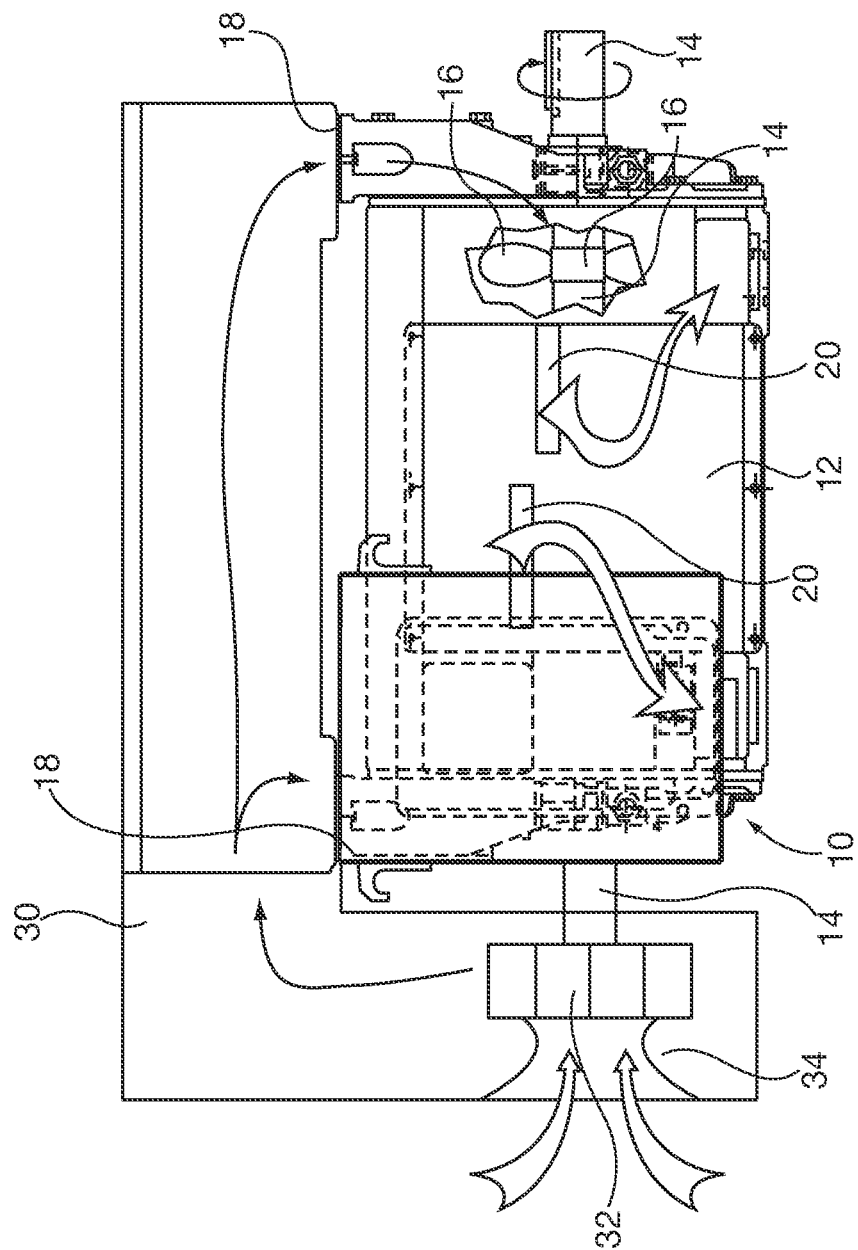
FIG. 3 is a partially cut-away elevational schematic view of an electric machine alternating current motor with a cooling system embodiment of FIG. 2, showing pressurized air from the duct fan of the present invention being directed into a motor frame inlet vent.

FIGS. 2 and 3 show an exemplary application of the present invention external cooling system to electric motor 10, having internal structure similar to that of motor 10', including motor housing 12, rotating shaft 14, internal housing fan 16 driven by the shaft, one or more housing cooling vents, such as cooling inlets 18 and housing cooling outlets 20. A housing airflow cooling path is defined within the housing 12 between the housing cooling inlets 18 and outlets 20, assisted by the pumping action of internal housing fan 16.

In the embodiment of FIGS. 2 and 3 duct 30 is coupled to the motor 10 cooling inlets 18. Duct fan 32 is a radial fan driven by motor shaft 14 disposed within the duct 30. The duct fan 32 may be affixed directly to the motor shaft 14. If an existing motor shaft design does not project sufficiently outside the motor housing to provide surface for duct fan affixation, an auxiliary or extension shaft that retains that fan may be affixed to the existing shaft. One or more duct fans 32 may be enclosed within the duct 30, and they may be driven directly by shaft 14 or indirectly driven, such as through belt or chain driven pulleys (not shown). Referring to FIG. 3, ambient air (double arrows) is drawn into duct 30 fan shroud 34, where it is pressurized by duct fan 32 and is transported along a duct airflow cooling path into the motor housing cooling inlets 18, so that the duct airflow cooling path is in fluid and heat transfer communication with the housing airflow cooling path. Warmer air is exhausted to the ambient atmosphere as it passes through housing cooling outlets 20.

Figure 4:
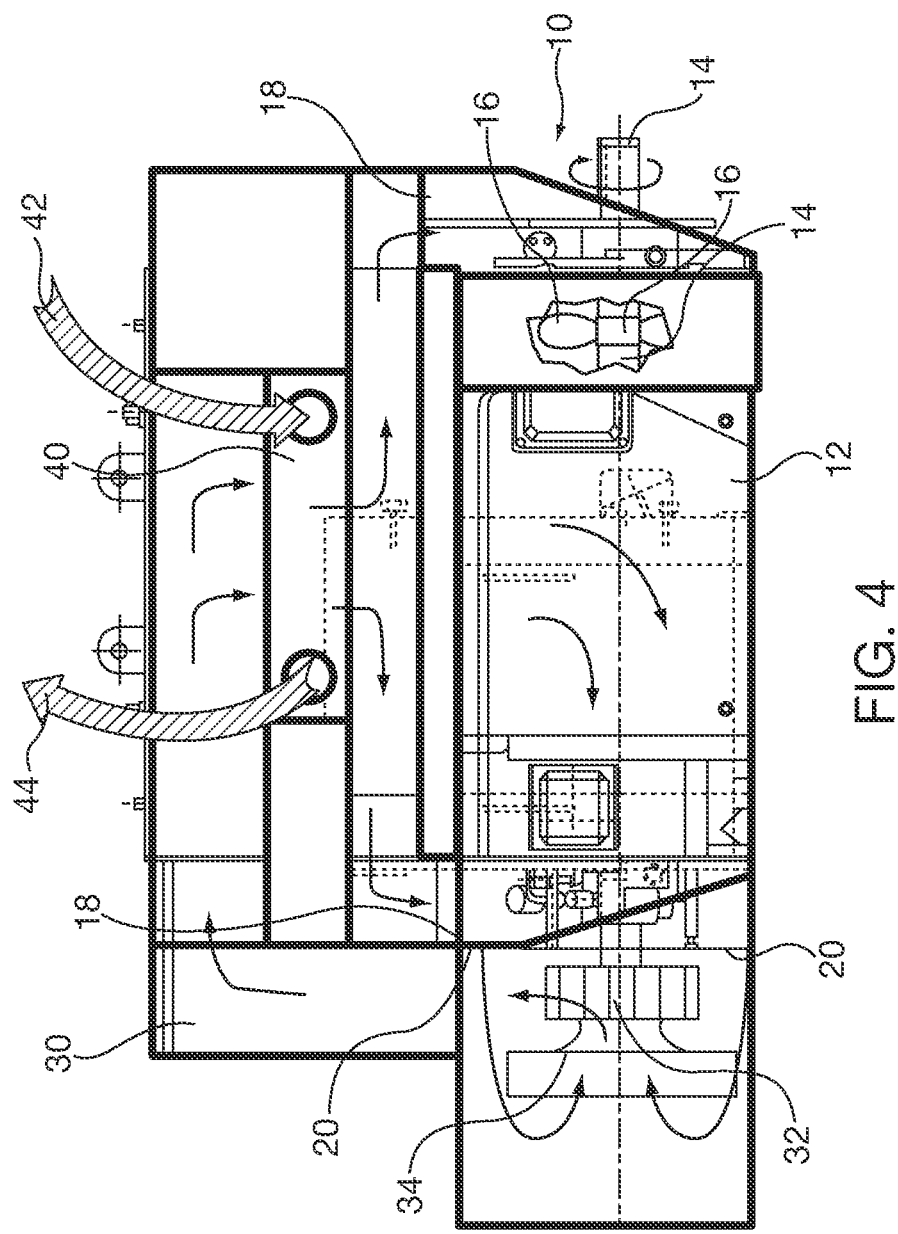
FIG. 4 is an elevational schematic view of an electric machine alternating current totally enclosed motor with a cooling system embodiment of the present invention, wherein the external duct is coupled to an outlet vent of the motor frame and directs exhausted air to the fan duct.

The electric machine external cooling system of the present invention can also be utilized with totally enclosed motors that do not receive or discharge ambient air to the atmosphere. FIG. 4 shows a totally enclosed water to air cooled (TEWAC) motor 10 having a housing 12 in which is mounted rotating shaft 14. Housing fan 16 is affixed to shaft 14 and facilitates transport of cooling air about the housing airflow cooling path from the housing cooling inlet vent 18 to the housing cooling outlet vent 20. Unlike "open" frame motors, the vents 18, 20 of this TEFC motor do not communicate with ambient air. Duct 30 is in communication with both the motor cooling inlet 18 and outlet 20 vents, forming a closed airflow circulation system that does not communicate with atmospheric ambient air. Duct 30 encloses duct fan 32 that may be a radial flow fan or any other fan design chosen by one skilled in the art. The duct fan 32 pulls air from the motor outlet vents 20 by way of the fan shroud 34. Pressurized air driven by the duct fan 32 is routed through the duct airflow cooling path into the motor cooling inlet vents 18, where the duct airflow cooling path communicates with the housing airflow cooling path.

In the embodiment of FIG. 4 motor heat is transferred out of the housing and duct airflow cooling paths by passing the air through air/fluid heat exchanger 40 that is interposed in the duct airflow cooling path between the duct fan 32 and motor cooling inlet vents 18. Intake cooling fluid, shown schematically by arrow 42 enters heat exchanger 40 where it absorbs heat from the motor cooling air. The now warmer cooling fluid is discharged as shown schematically by arrow 44.

Those skilled in the art will appreciate that the electric machine external cooling system of the present invention duct 30 can be configured to be coupled to housing cooling vents 18, 20 of existing design motors 10. The cooling system of the present invention, can be factory installed during initial manufacture or during subsequent repair shop maintenance overhauls. Alternatively the present invention cooling system can be installed in the field by service, technicians.

CONCLUSIONS

The present invention cooling system and methods provides those skilled in the art with a modular solution for cooling electric machines, such as alternating current motors. External ducts can be configured to communicate with machine housing inlet, or outlet cooling vents, or a combination of both, to provide duct airflow cooling paths that complement existing housing airflow cooling paths. By locating the duct fan outside the machine housing pumping capacity is not constrained by internal frame dimensions. Externally mounted duct fans can be retrofitted for different pumping capacity to meet changing operational performance cooling needs of the electric machine. Motor shaft driven duct fans do not need external power sources.

What is claimed is:

1. An electric machine external cooling system, comprising:
    an electric machine having a housing including therein:
        a rotating shaft retained within the housing;
        at least one housing cooling inlet vent and at least one housing cooling outlet vent formed in the housing periphery;
        a housing airflow cooling path, defined within the housing, in communication with both the housing inlet and outlet vents; and
    a duct enclosure externally coupled to the housing, including:
        a duct airflow cooling path, defined within the duct enclosure, in communication with both the housing inlet and outlet vents; and
        a duct fan within the duct enclosure and external the housing, coupled to and driven by the shaft, and in communication with the duct airflow cooling path and the housing inlet and outlet vents, for circulating air at above ambient pressure into the housing airflow cooling path wherein the duct fan and the duct and housing airflow cooling paths are isolated from ambient air to form a closed airflow cooling path within the cooling system.

2. The system of claim 1, wherein the housing airflow cooling path is in communication with the duct airflow cooling path and the duct fan, and wherein the duct fan causes circulation of air at above ambient pressure within the housing airflow cooling path.

3. The system of claim 2, wherein the duct airflow cooling path is in communication with housing airflow cooling path at both the inlet and outlet.

4. The system of claim 1, wherein the duct fan is directly coupled to and driven by the rotating shaft.

5. The system of claim 4, wherein the duct fan is a radial fan.

6. The system of claim 1, further comprising a housing fan driven by the shaft, retained within the housing and in communication with the housing airflow cooling path, for circulating air along the housing cooling path.

7. The system of claim 1, further comprising a heat exchanger within the duct enclosure in communication with the duct airflow cooling path.

8. An external cooling system for an electric machine of the type having a housing including therein:
    a rotating shaft retained within the housing;
    at least one housing cooling inlet vent and at least one housing cooling outlet vent formed in the housing periphery; and
    a housing airflow cooling path, defined within the housing, in communication with both the housing inlet and outlet vents;
    the external cooling system comprising:
        a duct enclosure adapted to be coupled to electric machine housing cooling inlet and outlet vents external the housing;
        a duct airflow cooling path, defined within the duct enclosure, adapted for communication with both the housing inlet and outlet vents; and
        a duct fan within the duct enclosure and external the housing, adapted to be coupled to and driven by the shaft, and in communication with the duct airflow cooling path and the housing inlet and outlet vents, for circulating air at above ambient pressure into the housing airflow cooling path wherein the duct fan and the duct and housing airflow cooling paths are isolated from ambient air to form a closed airflow cooling path within the cooling system.

9. The system of claim 8, wherein the housing airflow cooling path is in communication with the duct airflow cooling path and the duct fan, and wherein the duct fan causes circulation of air at above ambient pressure within the housing airflow cooling path.

10. The system of claim 9, wherein the duct airflow cooling path is in communication with housing airflow cooling path at both the inlet and outlet.

11. The system of claim 8, wherein the duct fan is directly coupled to and driven by the rotating shaft.

12. The system of claim 11, wherein the duct fan is a radial fan.

13. The system of claim 8, further comprising a housing fan driven by the shaft, retained within the housing and in communication with the housing airflow cooling path, for circulating air along the housing cooling path.

14. The system of claim 8, further comprising a heat exchanger within the duct enclosure in communication with the duct airflow cooling path.

15. A method of externally cooling an electric machine of the type having a housing including therein:
    a rotating shaft retained within the housing;
    at least one housing cooling inlet vent and at least one housing cooling outlet vent formed in the housing periphery; and
    a housing airflow cooling path, defined within the housing, in communication with both the housing inlet and outlet vents;
    the method comprising:
        coupling a duct enclosure to the electric machine housing cooling inlet and outlet vents external the housing;
        providing a duct airflow cooling path, defined within the duct enclosure, adapted for communication with both the housing inlet and outlet vents;
        coupling a duct fan to the shaft within the duct enclosure and external the housing, and orienting the duct fan in communication with the duct airflow cooling path and the housing inlet and outlet vents; and circulating air at above ambient pressure into the housing airflow cooling path wherein the duct fan and the duct and housing airflow cooling paths are isolated from ambient air to form a closed airflow cooling path within the cooling system.

* * * * *